United States Patent
Christian et al.

(10) Patent No.: US 9,465,878 B2
(45) Date of Patent: Oct. 11, 2016

(54) SYSTEM AND METHOD FOR DEPICTING BACKLINK METRICS FOR A WEBSITE

(71) Applicant: Go Daddy Operating Company, LLC, Scottsdale, AZ (US)

(72) Inventors: Jim Christian, Scottsdale, AZ (US); Sarah Munoz-Bates, Phoenix, AZ (US); Rajinder Nijjer, Phoenix, AZ (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 266 days.

(21) Appl. No.: 14/157,766

(22) Filed: Jan. 17, 2014

(65) Prior Publication Data
US 2015/0207692 A1    Jul. 23, 2015

(51) Int. Cl.
*G06F 15/173* (2006.01)
*G06F 17/30* (2006.01)
*H04L 12/58* (2006.01)
*H04L 12/24* (2006.01)

(52) U.S. Cl.
CPC ..... *G06F 17/30887* (2013.01); *G06F 17/3089* (2013.01); *H04L 41/22* (2013.01); *H04L 51/32* (2013.01)

(58) Field of Classification Search
CPC .............................. H04L 67/303; G06F 17/30
See application file for complete search history.

(56) References Cited

U.S. PATENT DOCUMENTS

| | | | |
|---|---|---|---|
| 6,453,347 B1 | 9/2002 | Revashetti et al. | |
| 6,754,873 B1 * | 6/2004 | Law | G06F 17/30864 707/999.003 |
| 7,363,296 B1 | 4/2008 | Naam et al. | |
| 7,565,630 B1 | 7/2009 | Kamvar et al. | |
| 7,620,725 B2 | 11/2009 | King et al. | |
| 7,693,827 B2 | 4/2010 | Zamir et al. | |
| 7,734,631 B2 | 6/2010 | Richardson et al. | |
| 8,271,488 B2 | 9/2012 | Murashige et al. | |
| 8,370,365 B1 | 2/2013 | Christian et al. | |
| 2003/0004773 A1 | 1/2003 | Clark et al. | |
| 2003/0050863 A1 | 3/2003 | Radwin | |
| 2003/0195837 A1 | 10/2003 | Kostic et al. | |
| 2004/0243568 A1 | 12/2004 | Wang et al. | |
| 2005/0038814 A1 | 2/2005 | Iyengar et al. | |
| 2005/0038894 A1 | 2/2005 | Hsu et al. | |
| 2005/0108325 A1 | 5/2005 | Ponte | |
| 2005/0198268 A1 | 9/2005 | Chandra | |

(Continued)

OTHER PUBLICATIONS

Actionable SEO: Using the world map, by Dixon Jones, Apr. 22, 2013.*

(Continued)

*Primary Examiner* — Yves Dalencourt
(74) *Attorney, Agent, or Firm* — Quarles & Brady LLP (57) ABSTRACT

A system and method for displaying metrics indicating the geographical source of backlinks to at least one of a website and a web page is presented. A plurality of backlinks are identified for a web page. Each of the plurality of backlinks includes a uniform resource locator (URL). For each backlink in the plurality of backlinks, the backlink is translated into an Internet protocol (IP) address, a geographical location associated with the IP address is identified, and the backlink is allocated to at least one of a plurality of geographical regions using the geographical location. A visual representation of at least one of the plurality of geographical regions and an indication of a number of backlinks allocated to the at least one of the plurality of geographical regions is displayed.

7 Claims, 7 Drawing Sheets

(56) References Cited

U.S. PATENT DOCUMENTS

| | | |
|---|---|---|
| 2007/0005564 A1 | 1/2007 | Zehner |
| 2007/0185855 A1 | 8/2007 | Shah et al. |
| 2007/0203906 A1 | 8/2007 | Cone et al. |
| 2007/0239680 A1 | 10/2007 | Oztekin et al. |
| 2007/0299815 A1 | 12/2007 | Starbuck et al. |
| 2008/0215429 A1 | 9/2008 | Ramer et al. |
| 2008/0222130 A1 | 9/2008 | Patel et al. |
| 2010/0030770 A1 | 2/2010 | Cao et al. |
| 2010/0058210 A1* | 3/2010 | Johnson .............. G06Q 30/02 715/764 |
| 2010/0094868 A1* | 4/2010 | Leung ............ G06F 17/30861 707/726 |
| 2010/0169356 A1 | 7/2010 | Malden et al. |
| 2010/0306832 A1 | 12/2010 | Mu et al. |
| 2011/0238665 A1 | 9/2011 | Parikh et al. |
| 2012/0246134 A1* | 9/2012 | Yu .................... G06F 17/30899 707/706 |
| 2013/0046747 A1 | 2/2013 | Gouyet et al. |
| 2013/0066819 A1 | 3/2013 | Nice et al. |
| 2013/0091142 A1 | 4/2013 | Joseph et al. |
| 2013/0144890 A1 | 6/2013 | Liu |
| 2013/0151496 A1 | 6/2013 | Jacobs et al. |
| 2013/0191377 A1 | 7/2013 | Zelevinsky et al. |
| 2013/0275164 A1 | 10/2013 | Gruber et al. |

OTHER PUBLICATIONS

Keywords—the Most Important Item in SEO, Mar. 23, 2007, pp. 1-4.

"Like a Match.com for Search Marketers, Linker Facilitates Relevant Link Exchanges," TechCrunch Article, Jun. 23, 2010.

"Eightfold Logic Intends to Link Up Potential Business Partners," Search Engine Watch Article, Jun. 23, 2010.

"Eightfold Logic Reinvents Linking to Maximize SEO Results—'Linker' Gives Businesses Easy and Meaningful Ways to Link and Be Found," Marketwire Article, Jun. 23, 2010.

Feb. 2, 2011 screenshots from www.linker.eightfoldlogic.com website.

* cited by examiner

| Country | Number of Backlinks | Percentage |
|---|---|---|
| Australia | 12,345 | 13% |
| Sweden | 563 | 2% |
| Brazil | 9,244 | 19% |
| France | 13,241 | 27% |
| United States | 12,359,838 | 45% |

SYSTEM AND METHOD FOR DEPICTING BACKLINK METRICS FOR A WEBSITE

FIELD OF THE INVENTION

The present invention relates generally to the display of metrics for websites and, more particularly, to systems and methods for displaying metrics indicating the geographical source of backlinks to at least one of a website and a web page.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Prevalent on the Web are multimedia websites, some of which may offer and sell goods and services to individuals and organizations. Websites may consist of a single webpage, but typically consist of multiple interconnected and related web pages. Websites, unless extremely large and complex or have unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, the browser requests and receives information from the webpage, typically in the form of an HTML document, and then displays the webpage content for the user. The user then may view other web pages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

Search engines are one of the primary mechanisms by which users navigate to a desired website on the Internet. Users often rely heavily on the ability of search engines to provide relevant results based upon an inputted query. In identifying the most relevant results in response to a particular query, search engines often attempt to gauge the popularity of particular websites. The more popular the website, the more likely the website is to be returned at a more prominent location in the list of search results. This follows because, in most cases, a more popular website is more likely to provide useful and relevant information than websites that are less popular.

One mechanism by which search engines gauge a website's popularity is the number and type of the website's backlinks. A backlink is an inbound link to the website that originates from another website. A popular website may have a large number of backlinks because many people have discussed and linked to the website from other websites.

As more and more users utilize search engines to find desired content on the Internet, the ranking of a particular website within a search engine is a very important factor in driving traffic to the website. If a website has a poor ranking, users may not visit the website and will instead visit websites having higher rankings. Accordingly, for a business that relies heavily on its website to drive sales, a poor search engine ranking could cost the business a significant amount of money.

Website owners, therefore, often take steps in an attempt to increase their website's search engine ranking. These techniques, referred to as search engine optimization (SEO), can include a website owner attempting to increase the number of backlinks to the website. This could involve, for example, a promotional campaign directed to increasing the visibility of the website on the Internet and, thereby, the number of backlinks.

In addition to improving search engine rankings, a website's backlinks provides useful information about the users of a website. The geographic location of the backlinks could indicate, for example, the markets in which the website (and, potentially, the website's commercial offering) is most popular. The origination location of backlinks could also provide useful information regarding the success of a particular marketing campaign focused upon a particular geographical region. This information could then be used by a business owner to fine-tune commercial efforts in a particular region.

DETAILED DESCRIPTION

The present disclosure relates generally to the display of metrics for websites and, more particularly, to systems and methods for displaying metrics indicating the geographical source of backlinks to at least one of a website and a web page.

In one implementation, a method is presented including identifying, by a server computer, a plurality of backlinks for a web page. Each of the plurality of backlinks includes a uniform resource locator (URL). The method includes, for each backlink in the plurality of backlinks, translating, by the server computer, the backlink into an Internet protocol (IP) address, identifying, by the server computer, a geographical location associated with the IP address, and allocating, by the server computer, the backlink to at least one of a plurality of geographical regions using the geographical location. The method includes displaying, by the server computer, a visual representation of at least one of the plurality of geographical regions and an indication of a number of backlinks allocated to the at least one of the plurality of geographical regions.

In another implementation, a method is presented including identifying, by a server computer, a location of each of a plurality of backlinks for a web page, and allocating, by the server computer, each one of the plurality of backlinks to at least one of a plurality of geographical regions using the location of each of the plurality of backlinks. The method includes displaying, by the server computer, a visual representation of at least one of the plurality of geographical regions and an indication of a number of backlinks allocated to the at least one of the plurality of geographical regions.

In another implementation, a system is presented including a server computer communicatively coupled to a network. The server computer is configured to identify a location of each of a plurality of backlinks for a web page, allocate each one of the plurality of backlinks to at least one of a plurality of geographical regions using the location of each of the plurality of backlinks, and display a visual representation of at least one of the plurality of geographical regions and an indication of a number of backlinks allocated to the at least one of the plurality of geographical regions.

The present system and method enables the analysis of a website's backlinks based upon a number of factors and attributes. The backlinks for a particular website can be identified automatically, without user interaction, or a user can provide a listing of backlinks for a particular website. Generally, the backlinks includes a URL identifying the webpage upon which the backlink appears. The URL of the webpage (referred to herein as the URL of the backlink) can then be analyzed to identify a geographic location of the webpage containing the backlink (referred to herein as the location of the backlink). In many cases this involves identifying a geographic location of the server hosting the webpage upon which the backlink appears. The geographic locations for each of the backlinks can then be analyzed to provide metrics to the website owner regarding the origination location of those backlinks. These metrics can be useful in refining marketing efforts, analyzing customer information, and generally improving the performance of the website on search engines. The metrics may be depicted in any suitable format. In one example, a three-dimensional globe is presented, upon which a number of structures, each representing a count of backlinks in a particular geographic region, are depicted. In other implementations, the metrics may be depicted in numerical form, listing counts for the numbers of backlinks having locations within particular regions. In other implementations, any suitable visual depiction or indication of backlink location may be utilized.

Figure 1:
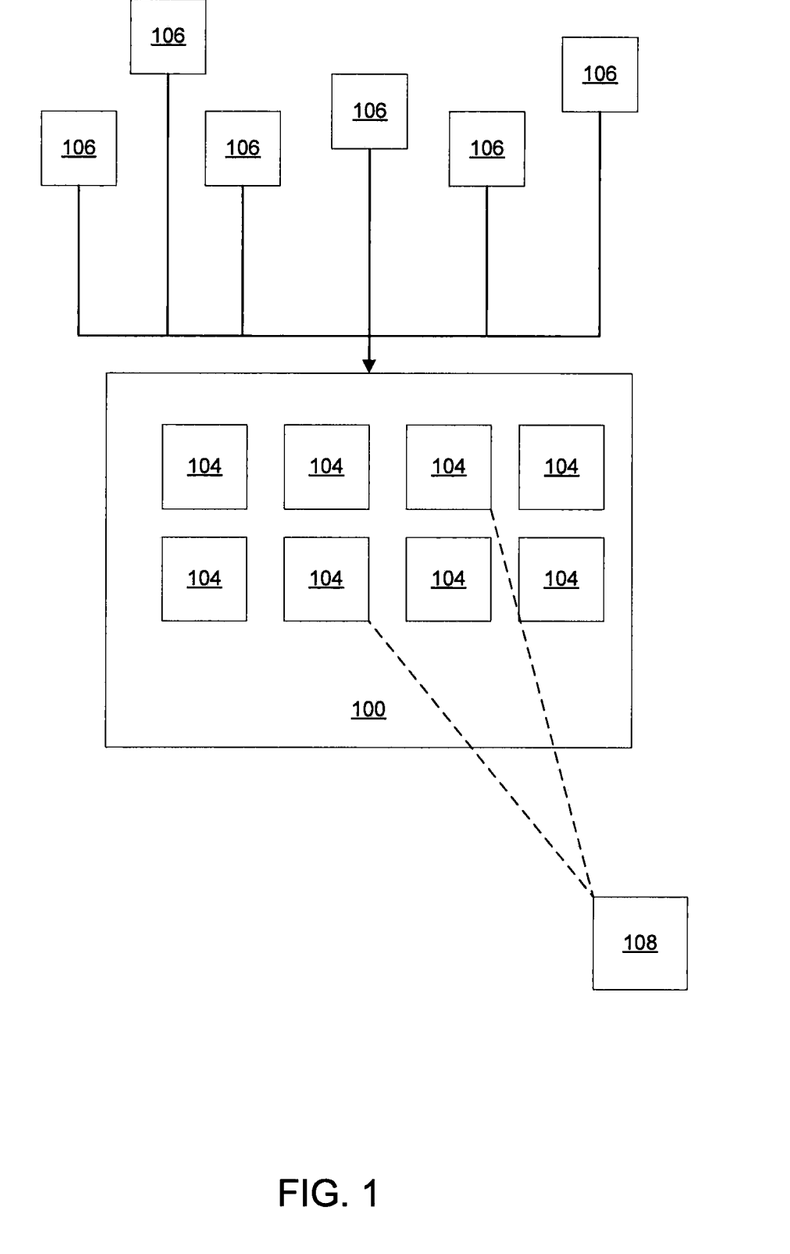
FIG. 1 depicts an environment in which the present system and method may operate.

FIG. 1 depicts an environment in which the present system and method may operate. The environment includes website 100. Website 100 includes a number of different web pages 104, which can each include different content and information. Website 100 may be, for example, a website of a small business (e.g., a restaurant, bakery, or artist). Each web page 104 could include information about the business, the business' products or services, pricing information, and the like.

A number of other web pages 106 belonging to other websites link to website 100, for example, by including a hyperlink that points to or references website 100. Web pages 106, therefore, include backlinks, and may link directly to a home page of website 100 or one of the other web pages 104 of website 100. The greater the number of web pages 106 linking to website 100, the greater the number of backlinks and, for many search engines, the popularity of website 100.

A user 108 may also communicate with website 100 to browse through one or more of web pages 104 of website 100. User 108 may have visited website 100, for example, by activating one or more of the backlinks provided on one or more of web pages 106.

Understanding the number and origination location of the backlinks to website 100 (i.e., contained within web pages 106) can be important in enhancing the marketing efforts of website 100. The origination location of the backlink web pages 106 can provide useful information regarding the markets in which website 100 is strongest. Conversely, this information can be useful in indicating the markets in which website 100 is not popular and, therefore, in which marketing capital should not be expended.

Figure 2:
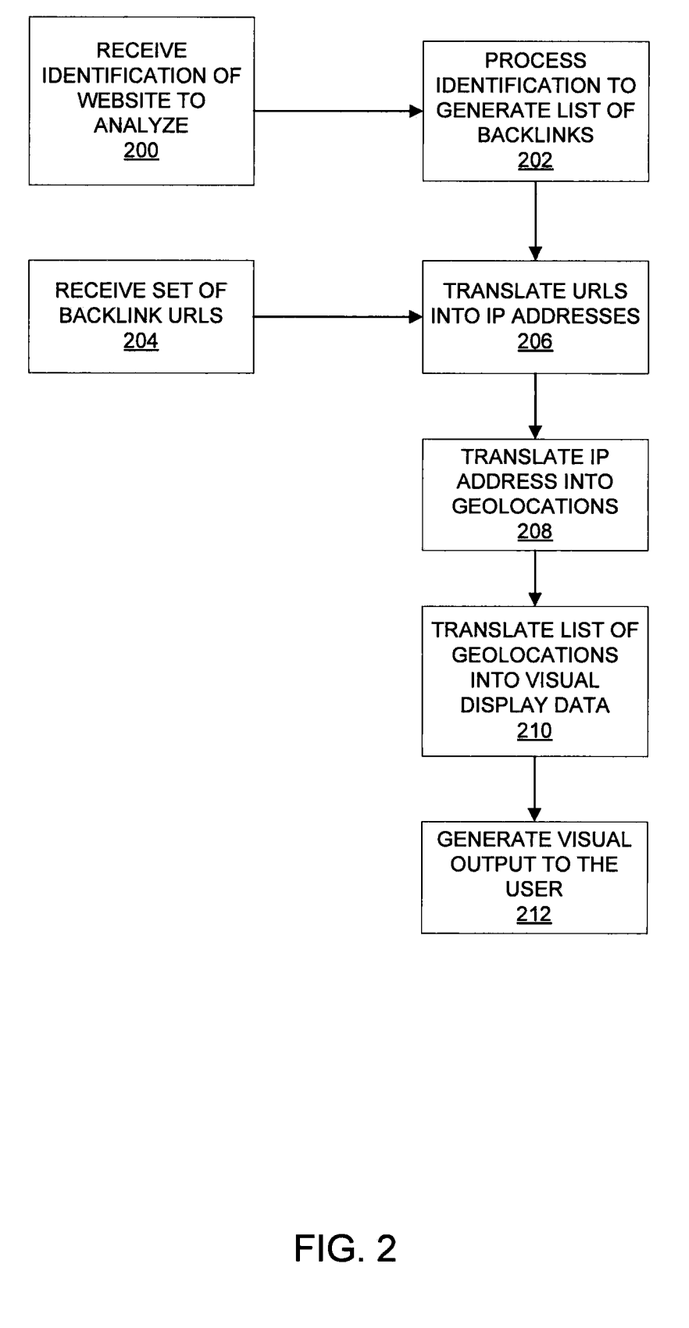
FIG. 2 is a flowchart illustrating a method by which the backlinks for a website can be analyzed in accordance with the present disclosure.

FIG. 2 is a flowchart illustrating a method by which the backlinks for a website (e.g., website 100 of FIG. 1) can be analyzed in accordance with the present disclosure. In step 200 an identification of the website (e.g., website 100) to be analyzed is received. The identification could be a URL of a primary or home page of the website. Alternatively, the identification could include any other information suitable for identifying a particular website. In one implementation, the identification identifies a hosting account. The records associated with the hosting account could then be analyzed to identify a website associated with the hosting account that is to be analyzed. In some implementations, rather than identify a website, the identification will identify a single web page (e.g., via a URL) that will then be processed according to the method described below. In this manner it would be possible to identify and process the backlinks for a single web page (or subset of web pages) rather than an entire website, which may include a large number of web pages.

Having identified the website to be analyzed, in step 202 a number of backlinks are identified for the website. In one implementation, the backlinks are the URLs of web pages that include links back to any of the web pages in the website being analyzed. The backlinks can be identified using any suitable method. For example, there exist a number of entities operating databases and services that track backlinks for a large number of websites on the Internet. Those services can be used to identify the backlinks in accordance with step 202. Example services include SEOMOZ, SEARCHMETRICS, GOOGLE WEBMASTER TOOLS, and the like. The services are generally configured to return a list of backlinks for a given website, web page, or list of web pages.

Step 202, therefore, enables a list of backlinks for a particular website to be generated without any additional input from the user beyond the identification provided in step 200. In some cases, however, the user will instead manually supply a list of backlinks to be analyzed. Accordingly, in step 204 a set of backlink URLs can be received. Step 204 may involve a user pasting a textual listing of URLs into a text input field of a web page. Alternatively, the user may provide a file (e.g., a text file or spreadsheet) containing the list of backlinks. In either case, at the completion of step 202 or 204 a number of backlink URLs have been identified for the website being analyzed. The URLs identify a web page that includes a link back to the website being analyzed.

In step 206, each of the backlink URLs generated in either step 202 or 204 is analyzed to generate an IP address of the server hosting the web page identified by the URL. Any suitable mechanism may be utilized to identify the IP address of each URL. In one implementation, the translation from URL to IP address can be performed by analyzing the domain name system (DNS) records of the website hosting each one of the web pages identified by the backlink URLs, though other suitable mechanisms may also be used.

In step 208, having identified the IP of each one of the backlink URLs, a geographic location or geolocation is allocated to each one of the backlinks. This may involve translating the IP address for each backlink URL into a set of global positioning system (GPS) coordinates that identify (or at least approximately identify) the location of the server hosting each backlink. Alternatively, each IP address can be translated into a street address, a city, state, or country identification, or a zip or postal code identifying the general location of the server hosting the backlink. In general, step 208 involves allocating at least an approximate geographical location, however represented, to each of the identified backlinks.

A number of services exist to assist in the translation of an IP address into a location. For example, MAXMIND-GEOIP is a service that can be utilized to translate an IP address into a location. Based upon an inputted IP address, the service can respond with either the city or the country in which the server allocated the IP address is located or GPS coordinates that correspond to that location.

At the conclusion of step 208, therefore, geographic locations having been allocated to each one of the backlinks that was identified in either step 204 or 202. In step 210, the geographic location data for the backlinks generated in step 208 is processed to be more suitable for display to a user reviewing the location data. This may involve translating the raw location data into visual data that is more easily reviewed and analyzed than numeric or textual data. The visual data can then be transmitted to a user for display in a visual representation of the visual data in step 212.

Figure 5A:
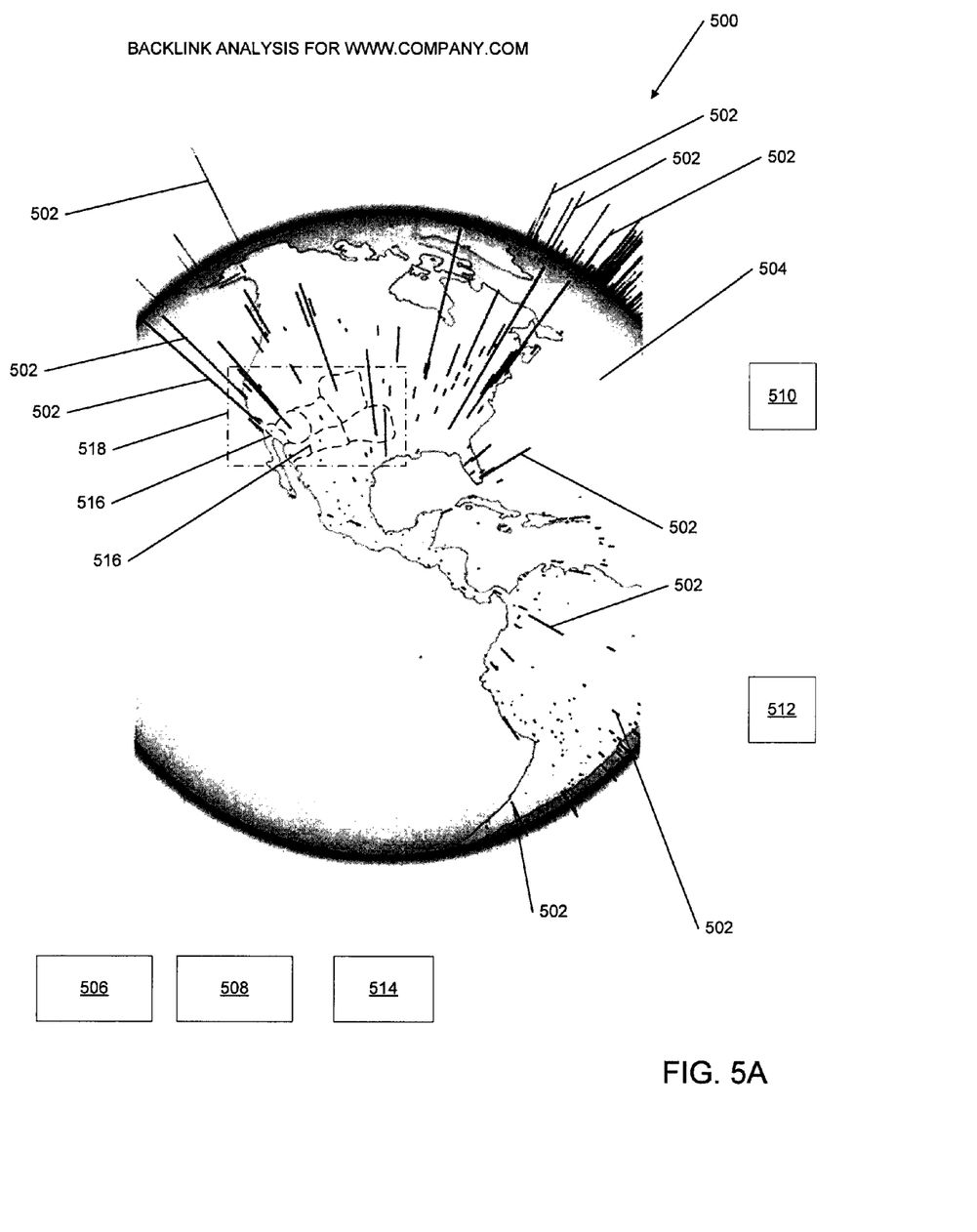
FIG. 5A depicts a screen shot showing an example user interface in which the location data of a number of backlinks can be depicted.
Figure 5B:
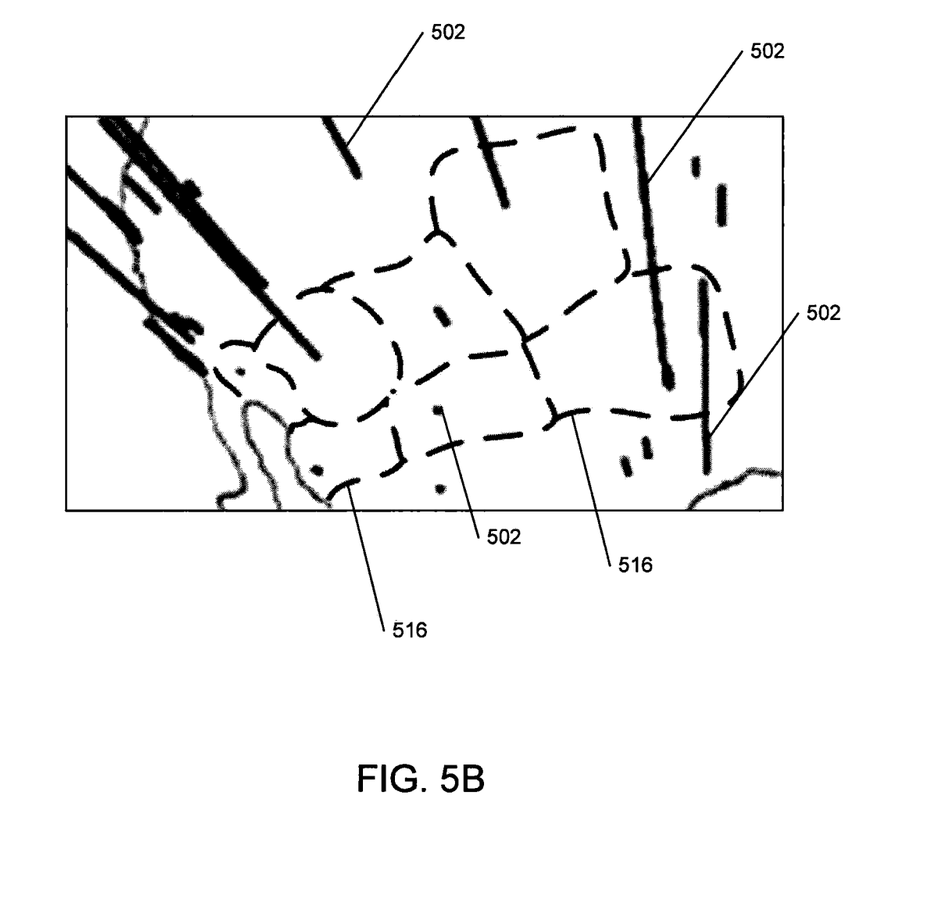
FIG. 5B depicts an enlarged view of region 518 of FIG. 5A.

To illustrate, FIG. 5A depicts a screen shot showing an example user interface in which the location data of the backlinks can be depicted. To provide additional detail, FIG. 5B depicts an enlarged view of region 518 of FIG. 5A. User interface 500 shows a portion of a three-dimensional globe that can be used to depict the geographic backlink data. Although FIG. 5A shows a specific example of a suitable user interface, it should be appreciated that many different user interfaces may be utilized to depict the backlink location data, or summaries of the same, in accordance with this disclosure. FIG. 5A depicts a globe in which the height of each of columns 502 represents the counts of backlinks within particular geographical regions. In other implementations, any suitable representation of a geographic area, such as two-dimensional maps, satellite imagery, topological maps, and the like, can be used to represent different regions for which the backlink location data can be displayed. Additionally, the columns 502 depict only a single manner in which the backlinks counts can be depicted for a particular geographic region. Any suitable shape, text, image, icon, or the like can be used as an indication to indicate to the user the count of backlinks within a particular region.

As shown in FIG. 5A, a number of lines or columns 502 project away from the center of globe 504. The height of each column 502 represents the number of backlinks that have geographic locations falling near the column. Taller columns indicate that more backlinks are present within that region, while shorter columns indicate fewer backlinks are present within that region. Any suitable algorithm or equation may be used to select appropriate heights of each of the columns 502 based upon the number of backlinks originating from the geographical region in which the column is positioned. In one implementation, a maximum possible height (max_height) for each column 502 is determined, for example, for a particular view of globe 504. The height of each individual column can then be determined by the ratio of the number of backlinks in the same geographical region as the column (local_backlinks) and the total number of backlinks for the website (total_backlinks). In that case, the following equation could be used to calculate the height of a particular column: column_height=(max_height)*(local_backlinks/total_backlinks).

The interface presented in FIG. 5A allows a user to quickly identify those locations in which the majority of backlinks originate. This information, as described above, can be very useful in planning marketing efforts associated with the website and to otherwise refine and improve the commercial efforts of the website and/or a business associated with the website.

To generate columns 502 of FIG. 5A, each of the backlink locations are collected into different subdivisions referred to herein as geographical regions. The number of backlinks that fall within a particular geographical region can then be used to calculate the height of each column 502. Accordingly, depending upon the size of each geographical region, the number of columns 502 depicted in user interface 500 will change. With larger regions, the number of columns 502 will be reduced, and vice versa. Generally, each column 502 is positioned in the approximate center of its respective geographical region, though any suitable placements may be utilized.

Generally, globe 504 is rotateable within interface 500 enabling a user to reposition globe 504 in order to view different regions of globe 504.

In one implementation, where interface 500 allows the user to either zoom into or out of the globe (e.g., by scrolling a mouse wheel, sliding on a touch screen, or tapping particular keyboard keys), the size of the geographical regions for each column 502 can vary based upon the user's zoom level. As the user zooms into the globe, the size of the geographical regions into which the backlinks are arranged could be reduced. This would enable a user, for example, zooming into the globe so as to depict a single political region of a country (e.g., a state or county) on interface 500. At that zoom level, the geographical regions may be small enough so that the regions approximate the size of the cities present within the depicted portion of the globe. A column 502 would then be depicted for each of those regions. As the user zooms out, however, the size of the regions can be increased, thereby reducing the number of columns 502 that would be depicted in interface 500. When zoomed out to a level at which an entire continent can be viewed in interface 500, for example, the regions may approximate the size of states or counties, with a column 502 being depicted for each region. The regions may each have the same approximate shape and/or size, or, in some cases, the sizes and shapes of the defined regions could vary at different positions on globe 504. In FIG. 5A, a small number of geographical regions 516 have been drawn in dashed lines to represent the approximate geographical regions that could be formed around columns 502. Each column 502 depicted in FIG. 5A is generally allocated to its own geographical region.

In other implementations, the size of the geographical regions that subdivide the location data can be adjusted based upon the number of backlinks being analyzed. Based upon a statistical analysis of the location data, for example, it may be possible to select geographic region sizes so that a reasonable number of columns 502 are depicted. For example, the region size could be selected so that at least one backlink is present within each region. Alternatively, the region size could be selected so that no region includes a number of backlinks that exceeds a particular threshold value.

In other implementations, the geographical regions can be adjusted based upon the density of backlinks present within different regions of the globe. In areas of the globe where the backlink density is relatively low, the region size can be increased. Conversely, in areas where the backlink density is higher, the region size can be reduced.

In still other implementations, the backlink location data can be further subdivided based upon other attributes of the backlinks. For example, the backlinks can be subdivided based upon the top level domain (TLD) of the web pages hosting the back links. In that case, different columns 502 (e.g., having different colors, shapes, labels, and the like) can be displayed to represent the number of backlinks in particular geographical regions belong to particular TLDs. Columns 502 could be depicted, for example, for the .com, .gov, and .org TLDs, as well as columns for particular custom TLDs.

An additional attribute of the backlinks that may be utilized to adjust the height of the columns 502 may be the page or domain authority associated with each of the backlink web pages. The page or domain authority can be an indicator of how highly ranked the web page containing the backlink is within one or more search engines. Based upon the page authority of the web page containing the backlink (or the domain authority of the domain containing the backlinking web page), the backlink's affect on the height of its respective column 502 can be adjusted. Backlinks that are present on web pages having a higher page authority and/or domain authority may cause the height of the column 502 to increase to a greater degree than backlinks present on web pages with a lower page authority and/or domain authority. This may be because backlinks associated with higher page and/or domain authority will have a greater affect on the search engine rankings for the website being analyzed than backlinks associated with lower page and/or domain authority. Consequently, the size of columns 502 could be adjusted based upon both the number of backlinks contained within a particular geographic region as well as the page authority and/or domain authority of the web pages containing those backlinks.

The depiction of columns 502 may also be adjusted based upon whether one or more of the backlinks associated with a column 502 includes a followed link or a non-followed link. If a particular link has been followed, many search engines may give the link an increased weighting in search results. Consequently, followed links may be more valuable than non-followed links. As such, in the depiction of columns 502, followed backlinks may be given more weight, which may be represented by the height of the columns being increased more by the presence of followed links as compared to non-followed links.

Figure 3:
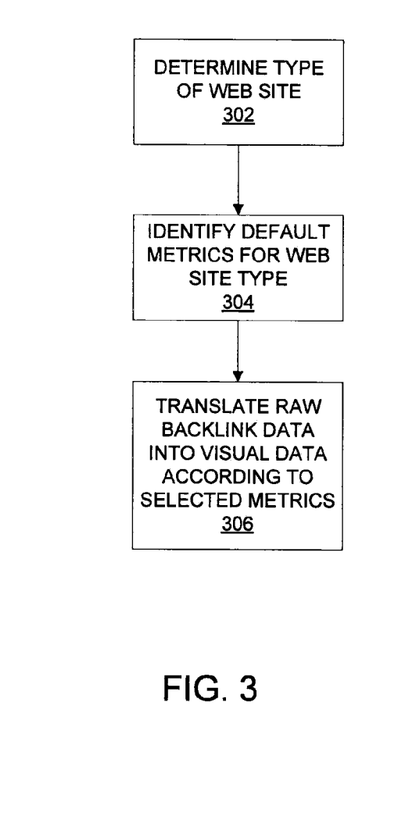
FIG. 3 is a flow chart depicting an example method by which the geographic location of each of a plurality of backlinks can be translated into visual data.

FIG. 3 is a flow chart depicting an example method by which the geographic location of each of the backlinks can be translated into visual data for depiction via interface 500. As such, FIG. 3 depicts a detailed method that may be used to perform step 210 of the method depicted in FIG. 2.

As illustrated in FIG. 3, in step 302, a type of the website being analyzed is determined. In one implementation, the types may include personal website, journalism website, and business website. In other implementations, the types may include any appropriate classifications into which a particular website may be allocated, such as particular types of businesses (e.g., restaurants, mechanics, coffee shops, and the like), particular types of news reporting websites (e.g., tech journalism, political journalism, extreme sports journalism, and the like), particular types of personal websites (e.g., family blogs, wedding websites, personal philosophy blogs, and the like). The type of the website may be determined by analyzing customer records associated with a hosting account for the website. When signing up for hosting services, for example, the user may complete a form indicating which type of website the user intends to create. That information could be saved in records associated with the user in suitable user account information database and utilized to identify the type of website. Alternatively, the content of the website may be analyzed (e.g., via a learning classification algorithm) to determine the type of website being analyzed.

Once the website has been typed, in step 304 a number of default metrics may be identified for the website's type. Those metrics can then be used in step 306 to translate the raw backlink location data into visual data according to the default metrics. Different metrics may be established for each potential type of website and stored in a suitable database and may set forth requirements that specify one or more attributes of the geographical regions that will be used in analyzing the backlink data. If the website is a personal website, for example, the metrics may specify that the backlinks are to be grouped by country. Additionally, the personal website metrics may indicate that the backlinks are to also indicate the number of backlinks originating from different TLDs.

If the website is a journalism website, the metrics may specific that backlinks are to be grouped based upon the language of the web pages including the backlinks. Backlinks in regions that speak a different language than that of the website can be grouped together in larger geographical regions, while backlinks in regions that speak the same language can be grouped in smaller geographic regions. This would provide the viewer more detail regarding how the backlinks are distributed through regions speaking the same language as the website being analyzed and, thereby, the target audience of the website, while providing more of a summary view of the backlink data for regions that do not speak the same language.

If the website is a commercial website, the metrics may specify that the backlinks are to be grouped based upon the primary places or zones of business of the website. The primary places or zones of business for the website may be identified, for example, explicitly in the hosting account settings associate with the website (e.g., when setting up a hosting account, a user may directly enter his or her primary places or zones of business). Alternatively, the primary places or zones of business may be identified by analyzing sales data of products and services sold through the website. Sales through other channels of distribution (e.g., at brick-and-mortar stores) may also be utilized in determining the primary places or zones of business.

Once the primary places or zones of business are identified, the average size of the geographical regions used to group the backlinks may be smaller in the primary places or zones of business, and larger outside the primary places or zones of business. In general, the average size of geographic regions used to group the backlinks may be smaller in the primary places or zones of business, and larger outside the primary places or zones of business. This approach gives the user more precise backlink information in the website's primary places or zones of business, in which the user is likely more interested in precise data.

When selecting geographic regions of different sizes in which to group the identified backlinks, the geographic regions may be based upon existing political divisions. Political divisions may include, for example, the boundaries of a neighborhood, town, city, county, state, country, continent, and the like. The geographical regions grouping the backlinks may simply fall along existing political divisions. When selecting geographical regions for a business, the regions in the business' primary places or zones of business could be selected to be of a first political division, while the geographical regions outside the primary places or zones of business could be a second political division. In such a case, the average size of the first political division could be smaller than the average size of the second political division.

Although the method of FIG. 3 provides for the determination of a default metric configuration based upon a particular type of the website being analyzed, user interface 500 could provide a number of buttons, toggles, sliders and/or menus allowing a user to adjust the information as it is displayed in interface 500. For example, a user input 506 may be provided allowing the user to adjust the size of the geographical regions that are used to group the backlink location data. Input 506 could include a slider in which moving the slider in one direction increases the size of the geographical regions, while moving the slider in another direction reduces the size of the geographical regions. Where display 500 is using multiple geographical region sizes (e.g., in the case of the website being a business website and a first set of geographical regions are defined for the business' primary places or zones of business and a second set of geographical regions are defined outside the business' primary places or zones of business), multiple sliders (or other user inputs) can be provide to adjust the size of each set of geographical regions.

Where the geographical regions are defined by political divisions, user interface 500 can provide the user with a set of different political division to select from in subdividing the backlink data.

User interface 500 may also allow the user to make a selection of one or more of columns 502 in order to learn more information regarding the backlinks making up the selected columns 502. Columns 502 can be selected, for example, by dragging a selection box, or other shape, about a number of different columns 502. Alternatively, one or more individual columns 502 can be incorporated into a selection by clicking or tapping upon a number of columns 502.

Once one or more columns 502 are selected, user interface 500 can automatically, or with a specific input by the user, display information describing the selected columns 502. The information may include, for all of the backlinks making up the selected columns 502, the average age or a graph showing the distribution of ages of the backlinks, the types of languages appearing on web pages hosting the backlinks, the percentages of backlinks having particular TLDs, the total number of websites that are hosting the backlinks, and the like.

In one implementation, having selected a number of columns 502 in a particular region, user interface 500 may provide the user with an option to focus marketing efforts within the selected geographical region. This may involve, for example, linking the user to a search engine optimization tool, such as GODADDY's SEARCH ENGINE VISIBILITY tool that enables the user to increase marketing efforts in a particular region.

In other cases, with a number of columns 502 selected, user interface 500 could provide the user with an option to purchase domain names having TLDs belong to the countries in which the selected columns 502 are located. For example, if the website being analyzed is "company.com" and the user selected one or more columns 502 in Italy, the user may be presented with the option to buy the Italian domain name "company.it", or user interface 500 may automatically generate a number of domains relevant to "company.com" that are available for purchase and are under the Italian TLD. If the domain is already registered, the user may be presented with an option to bid upon the domain name or visit a website where such a bid or offer for purchase can be made.

Figure 6:
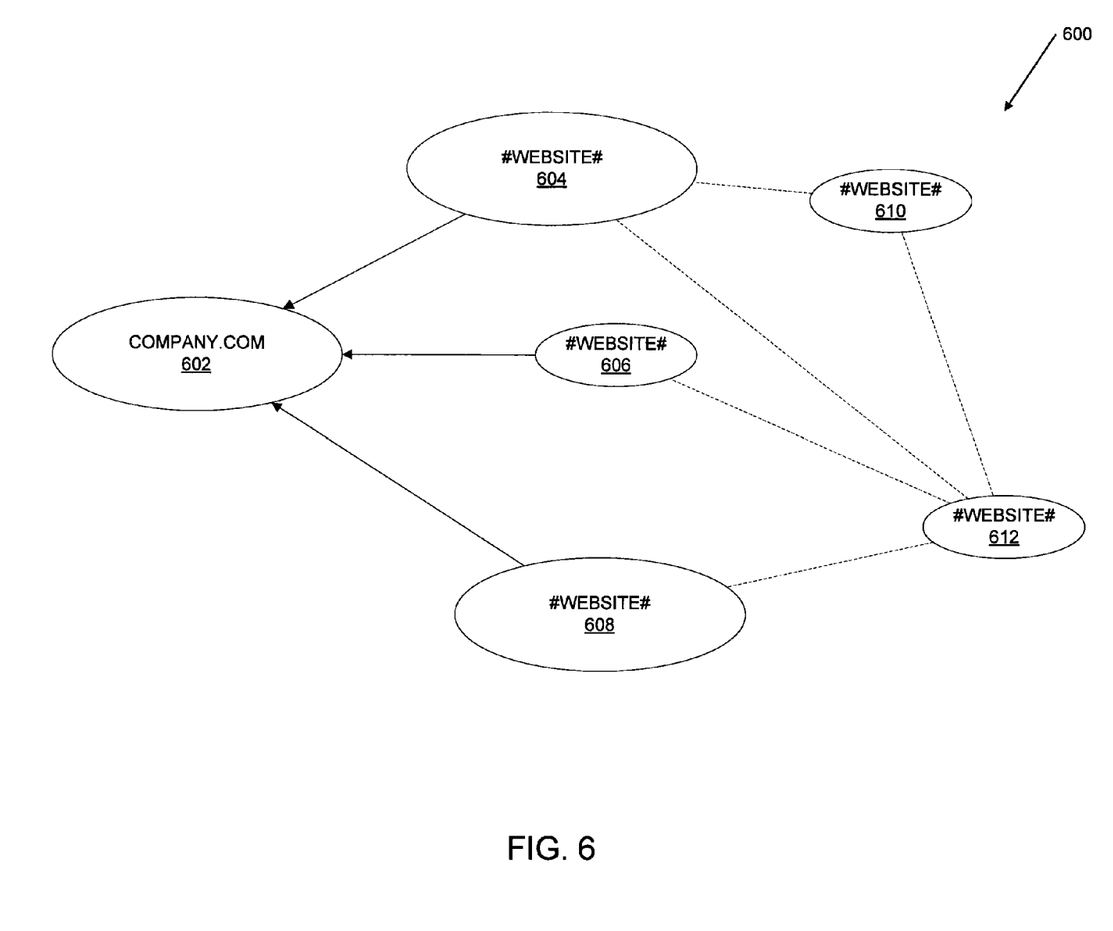
FIG. 6 is a graphic illustrating a number of websites or web pages belonging to a particular geographical region and the interrelationships formed between the websites or web pages.

Additionally, when a column 502 is selected within a particular region (e.g., a continent, country, or state) or a particular region is selected (e.g., by clicking upon a region 516 in user interface 500), the user interface 500 may provide the user with an option to view additional information describing the relationships between websites within that region. To illustrate, FIG. 6 depicts, for a selected region, a graph 600 showing the websites that are resident within that region that contain backlinks as well as the interrelationships formed between those websites or web pages. In FIG. 6, graph 600 therefore contains the website 602 being analyzed. Additionally, graph 600 depicts websites 604, 606, and 608, each of which includes a backlink to website 602. Each of websites 604, 606, and 608 are hosted in the region that was originally selected. However, in addition to showing the websites that contain backlinks, graph 600 also depicts the interrelationships between the websites that contain backlinks. Accordingly, graph 600 also depicts the relationships between websites 604, 606, and 608, which may, in some circumstances, include additional websites, such as websites 610 and 612.

In FIG. 6, the relative size of the icons (in this case, ovals), representing each website may be adjusted based upon any number factors, such as the overall value that a backlink from the website could bring, which could be determined based upon factors such as the page rank of the website, domain authority as determined by MOZ.COM, and the like.

In many cases, the number of backlinks and interrelated websites will be much higher than that depicted in FIG. 6. For some websites, it may number in the thousands. As such, the number of websites depicted in a display such as that of FIG. 6 may be limited to a select number of websites. For example, only the top 100 websites, as ranked by page rank or domain authority may be depicted in the graph.

By reviewing the content of graph 600, therefore, a user would be able to, for a particular geographical region, identify the prominent websites that are providing backlinks as well as identify good candidate for potentially adding new backlinks. For example, with reference to FIG. 6, website 612 may be a very good candidate for adding a backlink to website 602—via many different paths (e.g., through website 604, 606, and 608), website 612 is only 1 degree away from website 602. Accordingly, graph 600 may be useful tool in a website owner in increasing the number of backlinks to the website owner's website. Furthermore, because graph 600 may be limited to websites belonging to a particular country, graph 600 may be especially useful to a website owner attempting to build backlinks within a particular geographical location.

User interface 500 may also include a user interface 508 (e.g., a button or link) enabling the user to download a copy of the backlink data. The downloaded copy of the backlink data may be transmitted in any suitable form, such as a spreadsheet, database file, text file, or the like, enabling the user to perform further analysis of the downlink location data, possibly using custom-built analysis tools.

Additional user inputs or interfaces 510 and 512 may be provided enabling the user to either zoom into or out of the display presented by user interface 500. The user may also be presented with a user input 514 enabling the user to select from different display options for user interface 500. For example, the user may be able to select from various display formats for the depicted geographical region (e.g., 3-dimensional display, 2-dimensional view, satellite view, and the like).

Figure 7:
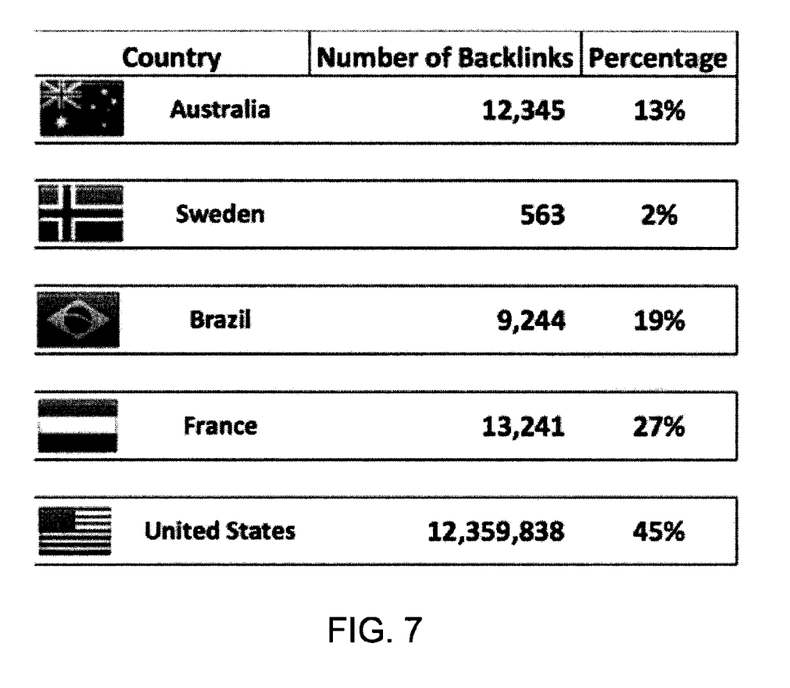
FIG. 7 is a table showing backlink geographical location data.

Although FIG. 5A depicts the backlink data in the form of a 3D globe having column-projections as indications of the number or count of backlinks originating from a particular geographical region, as mentioned above, other mechanisms may be utilized to depict the backlink data. For example, rather than use a 3D globe, FIG. 7 shows a numerical table depicting the backlink data as an alternative approach for displaying the backlink geographical location data. In the table, each row represents a different geographical region (in this example, countries). The columns of the table identify the geographical region, as well as a count of the number of backlinks originating in that geographical location and a percentage calculated by dividing the count for each row by the total number of identified backlinks.

In the same manner as selecting one or more columns 502 in the user interface of FIG. 5A, the user can select one or more rows in the table of FIG. 7 to either gather more information regarding the backlink data in the regions designated to the selected rows, or access additional functions (e.g., domain name purchasing, search engine optimization services) for the regions designated by the selected row or rows. Accordingly, the same functionality described in conjunction with the selection of one or more columns 502 of FIG. 5A may be provided in conjunction with the selection of one or more rows of numerical backlink data, such as that depicted in FIG. 7.

Figure 8:
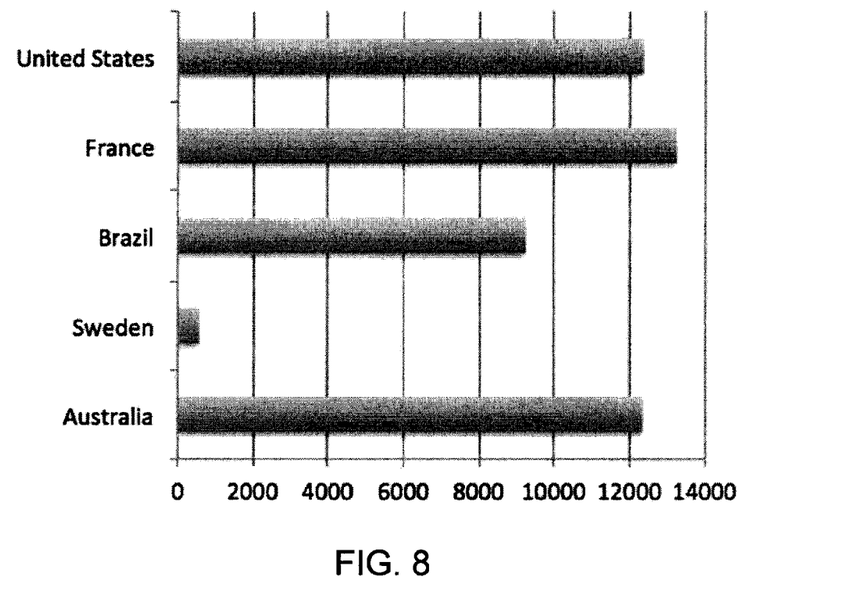
FIG. 8 is a bar graph showing backlink geographical location data.

FIG. 8 depicts a bar graph as an alternative approach for displaying the backlink geographical location data. In FIG. 8, each bar is associated with a particular geographical region (in this example, countries). The length of each bar represents the number of backlinks originating in the relevant geographical region. In the same manner as selecting one or more columns in the user interface of FIG. 5A, the user can select one or more bar in the graph of FIG. 8 to either gather more information regarding the backlink data associated with each the region of each selected bar, or access additional functions (e.g., domain name purchasing, search engine optimization services) for the regions of the selected bars. Accordingly, the same functionality described in conjunction with the selection of one or more columns 502 of FIG. 5A may be provided in conjunction with the selection of one or more bars in a bar graph, such as that depicted in FIG. 8.

Figure 4:
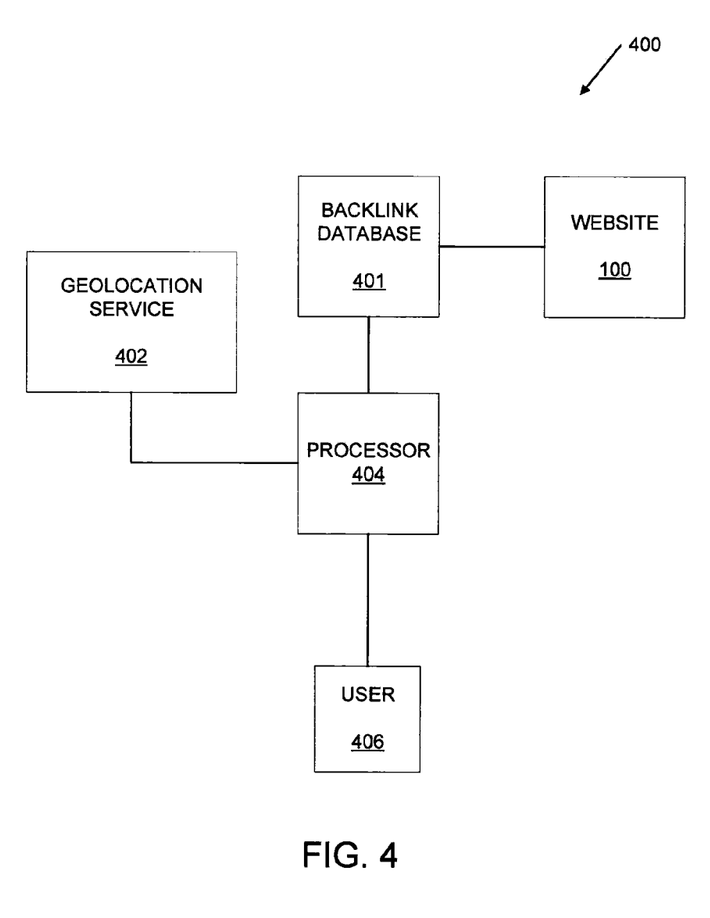
FIG. 4 is a block diagram illustrating the interconnections between functional elements of the present system.

FIG. 4 is a block diagram illustrating the interconnections between functional elements of the present system. System 400 includes website 100. It is the web pages containing backlinks to website 100 that are analyzed in accordance with the present disclosure. Website 100 may be hosted by any suitable hosting entity and is generally accessible via the Internet. A centralized processor 404 is configured to execute the methods illustrated in FIGS. 2 and 3 and described herein to provide backlink analysis of website 100. As such, processor 404 (e.g., a computer, server computer, or other computing device) is configured to receive the identity of website 100 in order to process the backlinks in accordance with the present disclosure.

User 406 is also in communication with processor 404. User 406, as described above, can provide an identification of website 100 to processor 404 to initiate the backlink analysis process. Alternatively, user 406 may supply processor 404 with a list of backlinks to be analyzed.

Backlink database 401 is in communication with processor 404 and website 100 and can be a remote or local database storing a listing of backlinks for website 100. Backlink database 401 may periodically analyze a large number of web pages on the Internet in order to catalog links that points between those web pages. Those links can then be sorted into lists of backlinks for various websites or web pages. With the backlink database 401 created, processor 404 can request a listing of existing backlinks for a particular website 100 or one or more web pages.

Having received the list of backlinks, processor 404 is configured to convert the URLs of the web pages containing the backlinks into IP addresses. This may be performed by the processor 404 or processor 404 may utilized a separate system (not shown) to perform the conversion.

Geolocation service 402 is configured to receive an IP address from processor 404, convert that IP address into a corresponding location, and return the location to processor 404. The location returned by geolocation service 402 generally identifies the location of a server hosting the IP address. The location may be set forth as a set of GPS coordinates, or a specific address. In other implementations, the location returned by geolocation server 402 may be more general, and only specify a town or zip code for the location, or other location identifier.

Having received the location information for the backlinks, processor 404 can generate a suitable depiction of the backlink location information and transmit that depiction to user 406. The depiction may include a visual representation of the backlink location data (see, for example, user interface 500 of FIG. 5A), textual data, numeric data, or combinations thereof.

As a non-limiting example, the steps described above (and all methods described herein) may be performed by any central processing unit (CPU) or processor in any computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plug-in), and other software configurations.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
   identifying, by a server computer, a plurality of backlinks for a web page associated with a website, wherein each of the plurality of backlinks includes a uniform resource locator (URL);
   accessing, by the server computer, an account information database to determine a type of the website;
   when the type of the web page is a business website:
      identifying a primary zone of business of the business,
      defining a first set of geographical regions in a plurality of geographical regions, the first set of geographical regions being at least partially located within the primary zone of business, and
      defining a second set of geographical regions in the plurality of geographical regions, the second set of geographical regions being at least partially located outside the primary zone of business, the first set of geographical regions having a different average size than the second set of geographical regions;
   when the type of the web page is a new reporting website:
      defining a first set of geographical regions in the plurality of geographical regions, the first set of geographical regions including countries that speak a language that is the same as a language of the website, and
      defining a second set of geographical regions in the plurality of geographical regions, the second set of geographical regions including countries that speak a language that is different than the language of the website, the first set of geographical regions having a smaller average size than the second set of geographical regions;

for each backlink in the plurality of backlinks:
- translating, by the server computer, the backlink into an Internet protocol (IP) address,
- identifying, by the server computer, a geographical location associated with the IP address, and
- allocating, by the server computer, the backlink to at least one of the plurality of geographical regions using the geographical location; and displaying, by the server computer, a visual representation of at least one of the plurality of geographical regions and an indication of a number of backlinks allocated to the at least one of the plurality of geographical regions.

2. The method of claim 1, wherein the geographic location includes a global positioning system (GPS) coordinate.

3. The method of claim 1, wherein identifying, by the server computer, the plurality of backlinks for the web page includes:

receiving an identification of the web page; and accessing a remote database to identify the plurality of backlinks for the web page.

4. The method of claim 1, wherein identifying, by the server computer, the plurality of backlinks for the web page includes receiving a listing of backlinks from a user.

5. The method of claim 1, wherein the indication of the number of backlinks includes an indication of a first number of backlinks having a first top level domain and a second number of backlinks having a second top level domain.

6. The method of claim 1, wherein the visual representation includes at least a portion of a globe.

7. The method of claim 6, wherein the indication of the number of backlinks allocated to the at least one of the plurality of geographical regions includes a column extending away from the globe.

\* \* \* \* \*